(12) United States Patent
Keep

(10) Patent No.: US 7,547,650 B2
(45) Date of Patent: Jun. 16, 2009

(54) FLAME RETARDANT MULTICOMPONENT ARTICLES

(75) Inventor: Gerald Timothy Keep, Kingsport, TN (US)

(73) Assignee: Missing Octave Insights, Inc., Kingsport, TN (US)

( * ) Notice: Subject to any disclaimer, the term of this patent is extended or adjusted under 35 U.S.C. 154(b) by 112 days.

(21) Appl. No.: 11/369,252

(22) Filed: Mar. 7, 2006

(65) Prior Publication Data

US 2007/0212963 A1 Sep. 13, 2007

(51) Int. Cl.
*D04H 1/00* (2006.01)
*D04H 13/00* (2006.01)
*D04H 3/00* (2006.01)
*D04H 5/00* (2006.01)

(52) U.S. Cl. .............. 442/414; 442/136; 428/920; 428/921

(58) Field of Classification Search ......... 442/136, 442/414; 428/920, 921
See application file for complete search history.

(56) References Cited

U.S. PATENT DOCUMENTS

| | | | |
|---|---|---|---|
| 3,801,422 A | 4/1974 | Gorlach et al. | |
| 4,404,297 A | 9/1983 | Fishler et al. | |
| 4,684,669 A * | 8/1987 | Wroczynski | 521/90 |
| 4,945,015 A | 7/1990 | Milner et al. | |
| 5,015,522 A | 5/1991 | McCullough, Jr. et al. | |
| 5,033,262 A * | 7/1991 | Montgomery et al. | 57/5 |
| 5,733,825 A | 3/1998 | Martin et al. | |
| 5,763,103 A | 6/1998 | McCullough | |
| 5,776,607 A | 7/1998 | McCullough | |
| 5,776,609 A | 7/1998 | McCullough | |
| 5,811,186 A | 9/1998 | Martin et al. | |
| 5,837,626 A | 11/1998 | McCullough | |
| 5,972,463 A | 10/1999 | Martin et al. | |
| 6,080,482 A | 6/2000 | Martin et al. | |
| 6,340,645 B1 | 1/2002 | Horacek et al. | |
| 6,511,730 B1 | 1/2003 | Blair et al. | |
| 6,809,129 B2 | 10/2004 | Abu-Isa | |
| 6,890,638 B2 | 5/2005 | Nguyen et al. | |
| 6,894,099 B2 | 5/2005 | Moore | |
| 6,911,070 B2 | 6/2005 | Gang | |
| 6,911,174 B2 | 6/2005 | Creagan | |
| 6,924,032 B2 | 8/2005 | Shimizu et al. | |
| 6,930,138 B2 * | 8/2005 | Schell et al. | 524/145 |
| 2002/0015847 A1 * | 2/2002 | Shimizu et al. | 428/375 |
| 2003/0082972 A1 * | 5/2003 | Monfalcone et al. | 442/138 |
| 2004/0102112 A1 | 5/2004 | McGuire et al. | |
| 2004/0253441 A1 | 12/2004 | Bansal et al. | |
| 2005/0233668 A1 | 10/2005 | Ogle et al. | |
| 2005/0255780 A1 | 11/2005 | Carter et al. | |

* cited by examiner

*Primary Examiner*—Norca L Torres-Velazquez
(74) *Attorney, Agent, or Firm*—Summa, Additon & Ashe, P.A.

(57) ABSTRACT

The present invention is directed to flame retardant multicomponent articles. The multicomponent articles include a reactive, migratory agent which is present in at least a first component of the article. The reactive migratory agent is capable of migrating from the first component of the article into a different component of the article under flame conditions to react with an element of that second component to produce a flame retardant effect. Applications include fibers, yarns, nonwovens, carpets, other fibrous materials, films, coating and composites.

70 Claims, 1 Drawing Sheet

FLAME RETARDANT MULTICOMPONENT ARTICLES

FIELD OF THE INVENTION

The present invention relates to articles having flame retardant properties and more particularly to multicomponent articles including at least one reactive agent in at least one component thereof which is capable of migrating under flame conditions to another component of the article and reacting with at least one other reactive agent present therein to impart flame retardant properties to the article.

BACKGROUND OF THE INVENTION

Articles having flame retardant properties can be desirable for use in a variety of applications, including home and office furnishings, bedding, protective apparel, and the like. Various approaches have been proposed to impart flame retardant properties to such articles.

For example, an article can include a high temperature flame retardant material, such as m- and/or p-aramid materials (e.g., Nomex® and Kevlar® materials), fiberglass, and the like. Despite the desired flame retardant properties of such materials, it can be difficult to manipulate these materials to form textile articles. In addition, such materials can be relatively heavy and thus undesirable for applications requiring lighter weights. Further, materials formed of these and other high temperature flame retardant materials can have undesirable aesthetics, resulting in a product that is harsh to the touch and is uncomfortable to the wearer. Such high temperature flame retardant materials can also be expensive, thereby increasing the costs of articles including the same.

Flame retardant agents can also be mixed with a resin to form a flame retardant composition, and the resultant composition can be subsequently processed to form the desired article. As an example, intumescent compositions can be mixed with a polymeric material and extruded. When such compositions are subjected to flame, charring and swelling can occur, which can provide a degree of insulation against continued combustion. The intumescent flame retardants can also produce non-flammable gasses created during the intumescent reaction.

Intumescent flame retardant systems, however, can be reactive at relatively low temperatures. The relatively low activation temperature of many intumescent flame retardant systems can limit their usefulness in polymer processing techniques, such as melt extrusion, which can require temperatures that are higher than the activation temperature of the intumescent flame retardant system. The temperature stability of intumescent systems can be improved by employing complex and/or exotic chemistries, yet such intumescent systems can be relatively expensive. Accordingly, their use can increase manufacturing costs. In addition, many intumescent flame retardant systems may be unsuitable for human contact or handling and thus can have limited applicability. Still further, many intumescent flame retardant systems can generate harmful or toxic gases, which can further limit the applications of such systems.

BRIEF SUMMARY OF THE INVENTION

The present invention is directed to multicomponent articles having flame retardant properties. The multicomponent articles include at least two or more components or segments that are physically distinct from one another and further include a flame retardant system. The flame retardant system includes at least two reactive agents capable of reacting with one another to provide an effective flame retardant effect.

At least one component of the multicomponent article includes at least one of the reactive agents, and at least one other of the components of the multicomponent article includes the other of the reactive agents. Stated differently, in the invention, the reactive agents are present as a part of the multicomponent article in distinct or different components or segments thereof. In the invention, as least one of the reactive agents is capable of migrating under flame conditions (also referred to herein as flame retardant activation or initiation conditions) to the other of the article components and reacting with the at least one other reactive agent present therein to provide a flame retardant effect.

Any flame retardant system known in the art can be useful in the present invention, so long as the flame retardant system includes reactive agents which are capable of reacting with one another to provide a flame retardant effect and further includes at least one reactive agent capable of migrating within a polymer matrix under flame conditions. In one embodiment of the invention, the flame retardant system may include at least two flame retardant additives, wherein at least one of the additives is capable of migrating between component(s) of the article under flame conditions (also referred to as the migratory reactive agent) and reacting with another additive present in a different article component to produce a flame retardant effect. In another embodiment of the invention, the flame retardant system may include at least one flame retardant additive in one component of the article, which is capable of migrating into another component of the article and reacting with the matrix resin of that component to create a flame retardant effect. Accordingly, in this embodiment of the invention, at least one of the reactive agents is an additive and the other of the reactive agents can be the polymer matrix. The present invention can further include combinations of these embodiments of the invention.

Gas generating flame retardant systems (including intumescent flame retardant systems which combine both off-gas and char formation) can be particularly useful in various embodiments of the present invention. Exemplary gas generating flame retardant systems useful in the invention can include at least one triggering agent that is capable of initiating a flame retarding effect upon reaction with the other of the reactive agents. In such an exemplary gas generating flame retardant system, at least another of the reactive agents can include at least one blowing agent capable of producing gases or vapors upon reaction with the triggering agent, which gases or vapors can act to expand the volume of resin present in the article. Such blowing agents can also be used to foam non-flame retardant containing polymers during extrusion.

The articles of the invention can further include one or more char forming agents. The triggering agent and/or the blowing agent can exhibit char forming properties. Alternatively, or in addition to, the article can include a char forming agent that is separate from the triggering agent and/or the blowing agent. Still further, the article can be formed of a material having char formation properties, all when subjected to fire threats.

Flame retardant systems useful in the present invention can have activation temperatures that are lower than many processing temperatures employed in the production of the article (such as melt extrusion temperatures). Nonetheless, the inventors have found that individual elements or reactive agents of the flame retardant systems can be substantially stable when kept separated from one another under many conventional processing conditions. Activation of the reactive agents is limited by migration of at least one of the reactive agents at flame temperatures. Accordingly, the articles of the invention can be readily processed, for example using conventional melt extrusion techniques, without prematurely triggering or activating a flame retardant effect. In addition, because the invention can allow such systems to be processed under many typical polymer processing conditions with minimal premature activation, the invention can minimize or eliminate the need for exotic flame retardant chemistries that can be relatively expensive, thereby reducing costs associated with the manufacture of such products. Further, in certain embodiments of the invention, the flame retardant systems can include flame retardant agents Generally Recognized As Safe (GRAS) by the Federal Drug Administration (FDA) and/or other government agencies for handling and/or contact by humans, and accordingly the articles can be useful in applications in which human contact of the product can occur. The resulting fibers further can have mechanical properties suitable for further textile, nonwoven and composite processing.

BRIEF DESCRIPTION OF THE DRAWINGS

Figure 1A:
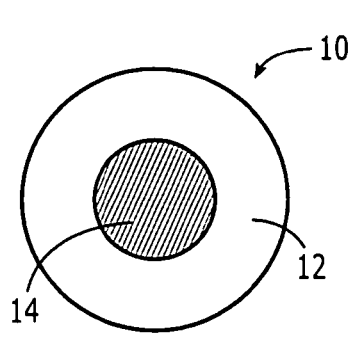
Figure 1B:
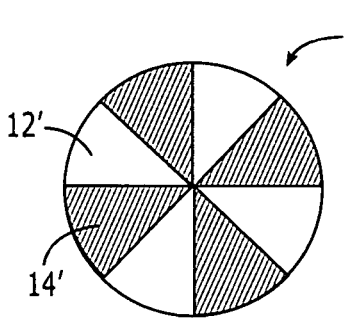
Figure 1C:
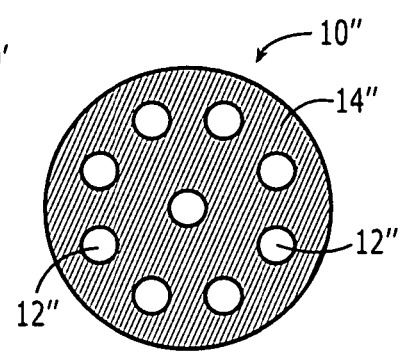
Figure 2A:
Figure 2B:
Figure 2C:
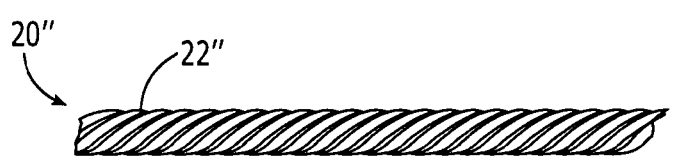
Figure 3A:
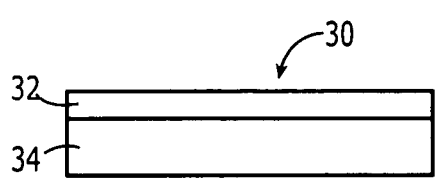
Figure 3B:
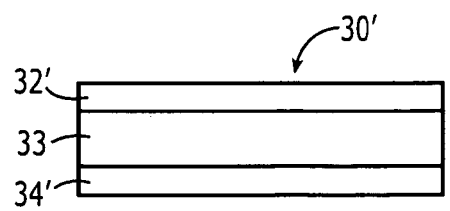

Having thus described the invention in general terms, reference will now be made to the accompanying drawings, which are not necessarily drawn to scale, and in which:

FIGS. 1A, 1B, and 1C are cross-sectional views of multicomponent fibers in accordance with exemplary embodiments of the present invention;

FIGS. 2A, 2B, and 2C are perspective views of fiber bundles in accordance with other exemplary embodiments of the present invention; and FIGS. 3A and 3B are cross-sectional views of laminate articles in accordance with further exemplary embodiments of the present invention.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements. Like numbers refer to like elements throughout.

As used in the specification, and in the appended claims, the singular forms "a", "an", and "the" include plural referents unless the context clearly dictates otherwise.

It will be understood that when an element such as a component, layer, substrate or the like is referred to as being "surface to surface," "on" or extending "onto" another element, it can be directly on or extend directly onto the other element or intervening elements may also be present. In contrast, when an element is referred to as being "directly surface to surface," "directly on" or extending "directly onto" another element, there are no intervening elements present. Similarly, it will be understood that when an element such as a component, layer, substrate or the like is referred to as being "attached" or "mounted" to another element, it can be directly attached to the other element or intervening elements may also be present. In contrast, when an element is referred to as being "directly attached" or "directly mounted" to another element, there are no intervening elements present.

It will be understood that relative terms, such as "lower" or "bottom" and "upper" or "top," may be used herein to describe one element's relationship to another element as illustrated in the Figures. Similarly, relative terms such as "underlying," "underneath," "below," and "beneath" may also be used to describe one element's relationship to another element as illustrated in the Figures. It will be understood that relative terms are intended to encompass different orientations of the articles in addition to the orientation depicted in the Figures. Furthermore, it will be understood that such terms can be used to describe the relative positions of element(s) to one another, and for example, the terms can refer to an element that is "beneath" or "underlying" another element, with or without other intervening elements therebetween.

Embodiments of the present invention are described herein with reference to various perspectives thereof, including cross-sectional and perspective illustrations that are schematic illustrations of idealized embodiments of the present invention. As such, variations from the shapes of the illustrations as a result, for example, of manufacturing techniques are to be expected. Thus, embodiments of the present invention should not be construed as limited to the particular shapes of components illustrated herein but are to include deviations in shapes that result, for example, from manufacturing and other variances, for example, to include the over hundreds of fiber shapes that can result from manufacturing, spinneret designs, and the like. The articles and their respective components illustrated in the figures are schematic in nature and their shapes are not intended to illustrate the precise shape of a component of an article and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

The multicomponent articles of the invention include at least two or more components or segments that are distinct from one another. As a non-limiting example, the multicomponent article can be a multicomponent fiber such as a sheath/core fiber 10 having an outer sheath component 12 surrounding a distinct core component 14 as illustrated in FIG. 1A. As another non-limiting example, the multicomponent article can be a laminate 30 including at least two layers 32 and 34, as illustrated in FIG. 3A. FIGS. 1B, 1C, 2A, 2B, 2C, and 3B illustrate other exemplary multicomponent articles useful in the present invention, as described in more detail below.

At least one component, and typically two or more components, of the multicomponent articles of the invention is formed of a polymer suitable for the formation of a particular article, i.e., can be any of the types of polymer resins known in the art capable of being formed into an article such as a fiber, fibrous materials, filament, film, sheet, coating, and the like. In certain embodiments of the invention, the article may include one or more components thereof formed of a polymer capable of forming char when exposed to a flame. Examples of suitable polymers, as well as copolymers, terpolymers, and the like, useful in the practice of the present invention include without limitation polyolefins, including polypropylene, polyethylene, polybutene, and polymethyl pentene, polyamides, including nylon 6 and nylon 6,6, polyesters, including polyethylene terephthalate (PET), polyethylene naphthalate (PEN), polytrimethylene terephthalate (PTT), poly(1,4-cyclohexylene dimethylene terephthalate) (PCT), and aliphatic polyesters such as polylactic acid (PLA), polyphenylene sulfide (PPS), thermoplastic elastomers, polyacrylonitrile, acetals, fluoropolymers, epoxies, phenoxies, vinyl alcohol polymers, polyesterimides, Hytrel®, hot melt adhesives, and the like, as well as co- and ter-polymers and ionomers of these and other suitable polymers, including without limitation copolyesters with substitution of a portion of the acid and/or glycol monomer (which copolyesters can be lower melt polymers than PET), and mixtures thereof. Functionalized polymers, such as but not limited to maleated functionalized polyolefins, can also be useful in various embodiments of the present invention.

The multicomponent articles of the invention further include a flame retardant system. The flame retardant system includes at least two reactive agents which are capable of reacting with one another to provide a flame retardant effect. In certain embodiments of the invention, the flame retardant systems can include reactive agents that are Generally Recognized As Safe (GRAS) by the Federal Drug Administration (FDA) and/or other government agencies for handling and/or contact by humans.

At least one of components of the multicomponent article (for example, sheath 12 of fiber 10 illustrated in FIG. 1A or layer 32 of laminate 30 illustrated in FIG. 3A) includes at least one of the reactive agents. At least one other of the components of the multicomponent article (for example, core 14 of fiber 10 illustrated in FIG. 1A or layer 34 of laminate 30 illustrated in FIG. 3A) includes the other of the reactive agents. Stated differently, in the invention, the reactive agents are present as a part of the multicomponent article in distinct or different components or segments thereof.

The components of the multicomponent article including the reactive agents are positioned relative to or in proximity to one another so that at least one of the reactive agents can migrate and react with the other of the reactive agents when the article is subjected to flame conditions (also referred to herein as flame retardant activation or initiation conditions). As used herein, the term flame conditions refers to the conditions under which at least one of the reactive agents can migrate to and react with the other of the reactive agents to provide a desired flame retardant effect. Suitable flame conditions include temperatures sufficiently high to promote the desired reaction and can include temperatures of at least about 230° C., and higher, although temperatures outside of this range can also be useful in the present invention. One advantage of the present invention is that although the flame retardant systems can have an activation temperature that is lower than the processing temperatures employed in the production of the article (such as melt extrusion temperatures), the individual elements of the systems can be substantially stable separately under these conditions. Stated differently, activation can be limited by migration of at least one of the elements at flame temperatures. Accordingly, although flame retardant initiation temperatures can vary depending upon the particulars of a given flame retardant system, typically the flame retardant agents do not react when processed separately under conventional processing conditions, such as polymer extrusion temperatures, storage temperatures, and the like.

Although not wishing to be bound by any explanation or theory of the invention, it is currently believed the following properties contribute to the ability of a reactive agent to migrate between article components. Typically, such migratory reactive agents have relatively low molecular weights (i.e., are not polymeric), are not locked in a crystal, and have sufficient mobility below the temperature of degradation to migrate the distance between components before significant combustion occurs. The number average molecular weight of such compounds can vary, for example, from about 100 to about 1000, and can range from about 100 to about 200. Compounds having a number average molecular weight less than about 100 can be too volatile whereas compounds having a number average molecular weight of greater than about 1000 may not exhibit sufficient mobility. Generally, such reactive agents can exhibit hydrogen bonding such as exhibited by acids, alcohols, and amines, which can reduce volatility.

In various embodiments of the invention, the components of the article including the reactive agents can be directly adjacent one another. An exemplary article in accordance with this embodiment of the invention is sheath core fiber 10 illustrated in FIG. 1A, in which sheath component 12 can include at least one of the reactive agents and in which core component 14 can include the other of the reactive agents. Another exemplary article in accordance with this embodiment of the invention is laminate 30 of FIG. 3A, in which at least one of layers 32 or 34 includes at least one of the reactive agents, and the other of layers 32 or 34 includes the other of the reactive agents.

The present invention is not limited to articles in which directly adjacent layers include the respective reactive agents. Accordingly, the present invention can also include articles in which the reactive agents are present in article components that are not directly adjacent one another. An exemplary embodiment of this embodiment of the invention can include, for example, a laminate article 30' illustrated in FIG. 3B, in which layer 32' includes at least one of the reactive agents and in which layer 34' includes the other of the reactive agents. In this embodiment, there can be one (as illustrated) or more layers 33 interdispersed between the components of the article that include the reactive agents, so long as the distance between the respective components is not sufficiently large to prevent substantial migration of one or both of the agents to the other of the respective components when the article is subject to flame retardant initiation conditions. For example, the components can be positioned relative to one another so that at least one of the reactive agents can migrate to the other of the reactive agents prior to breakdown or loss of supporting polymer matrix when the article is subjected to flame conditions.

Exemplary embodiments of the multicomponent articles of the invention include without limitation multicomponent fibrous materials, such as but not limited to multicomponent fibers, multicomponent filaments, yarns, fiber bundles, bulked continuous filament (BCF), staple fiber spun yarns, twisted yarns (i.e., 2 or more yarns twisted together), flocked fabrics, tufted carpets, and other engineered constructions, nonwoven fabrics, woven fabrics, knit fabrics, and the like. Other exemplary multicomponent articles in accordance with the present invention include laminate articles, which can include one or more film (including co-extruded films), sheet, and/or fabric components, and the like, and combinations thereof. The multicomponent articles of the invention further can include one or more coatings and/or hot melt adhesive components, such as coated yarns, extrusion coated laminates, composites, and the like, which coating and/or hot melt adhesive layer(s) can optionally include at least one reactive agent incorporated therein. It is noted that fibrous multicomponent articles in accordance with the present invention, including fibers and filaments, can exhibit suitable mechanical properties for textiles and nonwoven processing.

Multicomponent fibrous materials in accordance with the present invention can include multicomponent fibers of finite length, such as staple fibers, as well as substantially continuous multicomponent fibrous structures, such as continuous filaments. For ease of discussion, the term "fiber" as used herein can refer both to fibers of finite length, such as conventional staple fiber, as well as substantially continuous fibrous structures, such as continuous filaments, unless otherwise indicated. The term fiber as used herein can also include crimped, uncrimped, and textured fibers and filaments as well.

The multicomponent fibers can have a variety of fiber configurations as known in the art so long as the fiber components are arranged so as to form distinct cross-sectional segments along at least a portion of the length of the fiber. The fibers of the invention can be hollow or non-hollow fibers, and further can have a substantially round or circular cross-section or non-circular cross-section (for example, "shaped fibers" or fibers with shaped cross-sections, such as but not limited to oval fibers, rectangular fibers, multi-lobed or lobal fibers, delta cross-sections, and the like). The multicomponent fibers can include substantially non-occluded segments, such as those present in pie/wedge fibers, side-by-side fibers, segmented round fibers, segmented oval fibers, segmented rectangular fibers, segmented multilobal fibers, and the like. The present invention is not limited to non-occluded fiber constructions, and accordingly other fiber configurations are included within the scope of the present invention, including those in which at least a portion of a one fiber segment is partially or fully occluded by an adjacent segment, such as found in islands in the sea fiber constructions, sheath core fibers, and the like. The multicomponent fibers of the invention can be splittable, i.e., capable of separating into microfilaments upon appropriate chemical and/or mechanical action. Alternatively, the multicomponent fibers of the invention can be substantially nondissociable.

It is noted that if a bicomponent or multicomponent fiber is formed by bringing together two, or more, polymer melt streams, the fiber so formed should be quenched sufficiently rapidly to minimize migration and reaction of at least one of the reactive agents (that is, to minimize or prevent premature initiation of the flame retardant system). Impinging polymer melt streams below a spinneret to make a side-by-side bicomponent or multicomponent fiber is an example of one technique than can be useful in the present invention. As another alternative, the fiber may be formed in a multi-step process, such as extrusion coating.

FIGS. 1A-1C illustrate cross-sectional views of various multicomponent fibers in accordance with exemplary embodiments of the invention. As noted above, FIG. 1A illustrates a sheath/core fiber 10 having an outer sheath component 12 surrounding an inner core component 14. Also as noted above, in the invention, at least one reactive agent is present in sheath 12 and the other of the reactive agents is present in core 14. In one embodiment of the invention, the reactive agents can be flame retardant additives. In this embodiment of the invention, at least one of the additives can be present in sheath 12, and the other of the additives can be present in core 14. In another embodiment of the invention, at least one reactive agent can be a flame retardant additive present in sheath 12 or core 14, and the other reactive agent can include the polymer or resin matrix of the other of sheath 12 or core 14.

FIG. 1B illustrates a pie-wedge fiber 10' including a plurality of generally wedge shaped alternating components 12' and 14'. In this embodiment of the invention, at least one of the reactive agents can be present in one or more of components 12' and at least one other reactive agent can be present in one or more of components 14'. In one embodiment of the invention, the reactive agents can be flame retardant additives.

In this embodiment of the invention, at least one of the additives can be present in one or more of components 12' and the other of the additives can be present in one or more of components 14'. In another embodiment of the invention, at least one reactive agent can be a flame retardant additive present in at least one or more of components 12' and/or 14', and the other reactive agent can include the polymer or resin matrix of at least one or more different ones of components 12' and/or 14'. The present invention is not limited to articles in which the reactive agents are present in adjacent article components, and accordingly, the reactive agents can also be present in one or more of alternating components 12', one or more of alternating components 14', and/or any combination thereof.

FIG. 1C illustrates an islands in the sea fiber 10" including a plurality of island components 12" surrounded by a matrix component 14". In this embodiment of the invention, at least one or more reactive agents can be present in one or more of island components 12" and at least another reactive agent can be present in sea component 14". In one embodiment of the invention, the reactive agents can be flame retardant additives. In this embodiment of the invention, the additives can be present in different ones of components 12" and/or 14". In another embodiment of the invention, at least one of the reactive agents can be a flame retardant additive present in one or more of components 12" and/or 14", and the other reactive agent can include the polymer or resin matrix of at least one or more different ones of components 12" and/or 14". Again, however, the invention is not limited to articles in which the reactive agents are present in adjacent components. Accordingly, in this embodiment of the invention, the reactive agents can be present in various ones of the islands components 14" only.

The skilled artisan will appreciate that the present invention is not limited to the multicomponent fiber constructions described herein. Rather, FIGS. 1A, 1B, and 1C are merely illustrative of the types of multicomponent fibers that can be useful in the present invention.

The multicomponent fibrous articles of the present invention are not limited to fibers and filaments but can also include other textile articles, such as but not limited to yarns, fiber bundles, bulked continuous filament (BCF), staple fiber spun yarns, twisted yarns, flocked fabrics, tufted carpets, and other engineered constructions, nonwoven webs, woven fabrics, knit fabrics, and the like. These and other multicomponent fibrous articles can include one more coating(s) and/or hot melt adhesive component(s), which can optionally include at least one reactive agent incorporated therein.

FIGS. 2A, 2B, and 2C illustrate schematic perspective views of exemplary fiber bundles in accordance with the invention. FIG. 2A illustrates a fiber bundle 20 including a plurality of discrete fiber components 22, wherein the fiber bundle 20 has substantially no twist. In this embodiment of the invention, at least one of the fiber components 22 can include at least one reactive agents, and at least another of the fiber components 22 can include at least another of the reactive agents. In one embodiment of the invention, the reactive agents can be flame retardant additives. In this embodiment of the invention, at least one or more of the fibers 22 can include at least one of the additives, and at least one or more of different fibers 22 can include the other of the additives. In another embodiment of the invention, at least one reactive agent can be present as an additive in at least one or more of fibers 22, and the other reactive agent can include the polymer or resin matrix of at least one or more different ones of fibers 22. Alternatively, or in addition to, one or more of the fiber components 22 can include a multicomponent fiber in which at least one of the components includes at least one reactive agent and at least another of the fiber components includes another of the reactive agents, such as described above.

FIG. 2B illustrates a plurality of discrete fiber components 22' forming a fiber bundle to which twist is imparted to form a coherent yarn structure 20'. Such yarns may be prepared from continuous filament or spun yarns comprising staple fibers by methods known in the art, such as twisting or air entanglement. Often, this is followed by heat setting. Similar to the fiber bundle of FIG. 2A, in this embodiment of the invention, at least one of the fiber components 22' can include at least one of the reactive agents, and at least another of the fiber components 22' can include at least another of the reactive agents. In one embodiment of the invention, the reactive agents can be flame retardant additives. In this embodiment of the invention, at least one or more of the fibers 22' can include at least one of the additives, and at least one or more of different fibers 22' can include the other of the additives. In another embodiment of the invention, at least one reactive agent can be present as an additive in at least one or more of fiber components 22', and the other reactive agent can include the polymer or resin matrix of at least one or more different ones of fiber components 22'. Alternatively, or in addition to, one or more of the fiber components 22' can include a multicomponent fiber in which at least one of the components includes at least one reactive agent and at least another of the fiber components includes another of the reactive agents.

FIG. 2C illustrates a blend of a plurality of discrete staple fiber components 22", wherein the blend of staple fibers 22" are twisted into a staple spun yarn 20". In this embodiment of the invention, at least one of the fiber components 22" can include at least one reactive agents, and at least another of the fiber components 22" can include at least another of the reactive agents. In one embodiment of the invention, the reactive agents can be flame retardant additives. In this embodiment of the invention, at least one or more of the fibers 22" can include at least one of the additives, and at least one or more of different fibers 22" can include the other of the additives. In another embodiment of the invention, at least one reactive agent can be present as an additive in at least one or more of fibers 22", and the other reactive agent can include the polymer or resin matrix of at least one or more different ones of fibers 22". Alternatively, or in addition to, one or more of the fiber components 22" can include a multicomponent fiber in which at least one of the components includes at least one reactive agent and at least another of the fiber components includes another of the reactive agents, such as described above. As will be appreciated by the skilled artisan, the staple spun yarn can be further twisted or braided.

Generally, the individual fibers 22, 22', or 22" including different ones of the reactive agents are sufficiently close to one another so that at least one of the reactive agents (whether the reactive agents include discrete flame retardant additives and/or a polymer matrix) can migrate to and react with the other of the reactive agents when the article is subjected to flame conditions. In one embodiment, the individual fiber components 22, 22', or 22" of the respective fiber bundles including different reactive agents can be adjacent one another. Alternatively, the individual fiber components 22, 22', or 22" including different reactive agents can be separated from one another by one or more fiber diameters. The distance between the fiber components 22, 22' and 22" can vary, depending on factors such as fiber denier, total number of fibers in the bundle, the number of fiber components including a reactive agent, the activation or initiation temperature of the reactive agents, the melt temperature of the polymer of the fibers, and the like. Fiber components including different ones of the reactive agents can be separated by several fiber diameters, for example, up to five, ten, or more fiber diameters, so long as at least one of the reactive agents can migrate to the other prior to breakdown or loss of supporting polymer matrix when the article is subjected to flame conditions.

Other fibrous articles can also be useful in the present invention, such as but not limited to nonwoven fabrics, woven fabrics, knit fabrics and the like, as well as combinations thereof to form a laminate structure. The fibers, filaments, or bulked filaments of the fibrous articles can be multicomponent fibers or filaments, including multicomponent fibers such as described above including reactive agents in different components thereof. Alternatively, or in addition to, the fibrous articles can include fibers and/or filaments including different reactive agents incorporated in different ones of the fibers/filaments.

Nonwoven webs can be made according to any of the known commercial processes for making nonwoven fabrics, including processes that use mechanical, electrical, pneumatic, or hydrodynamic means for forming or assembling fibers into a web, for example carding, wetlaying, air laying, spunbonding, meltblowing, and the like. The webs can be bonded using techniques as known in the art, such as but not limited to mechanical bonding, such as hydroentanglement and needle punching, adhesive bonding, thermal bonding, and the like, to form a coherent and useful fabric structure. An example of thermal bonding is through-air bonding, although other thermal bonding techniques, such as calendering, microwave or other RF treatments can be used. Other textile structures such as but not limited to woven and knit fabrics and tufted carpets and yarns prepared for use in forming such woven and knit fabrics and tufted carpets are similarly included within the scope of the present invention.

Any of the fibrous multicomponent articles of the invention can further include a coating and/or a hot melt or adhesive interface component, which may or may not include at least one of the reactive agents. In addition, fibers other than the multicomponent fibers of the invention including reactive agents in different components thereof may be present in articles produced therefrom, including any of the various synthetic and/or natural fibers known in the art.

Methods for making multicomponent fibers are well known and need not be described here in detail. Generally, the multicomponent fibers of the invention are prepared using conventional multicomponent textile fiber spinning processes and apparatus and utilizing mechanical drawing techniques as known in the art. Processing conditions for the melt extrusion and fiber-formation of suitable polymers are well known in the art and may be employed in this invention.

Generally, to form the multicomponent fiber of the invention, at least two fiber-forming polymers are melt extruded separately and fed into a polymer distribution system wherein the polymers are introduced into a spinneret plate. The polymers follow separate paths to the fiber spinneret and are combined in a spinneret hole. The spinneret is configured so that the extrudant has the desired shape. Following extrusion through the die, the resulting thin fluid strands, or filaments, remain in the molten state before they are solidified by cooling in a surrounding fluid medium, which may be ambient or chilled air blown through the strands, or immersion on a bath of liquid such as water. Once solidified, the filaments are taken up on a godet or another take-up surface. In a continuous filament process, the strands are taken up on a godet which draws down the thin fluid streams in proportion to the speed of the take-up godet. In spunbonding, air jet drawing is often used instead of drawing over one or more later temperature controlled godet rolls. In the jet process, the strands or thread lines pass through a jet or a high velocity air drawing device, blown onto a take-up surface such as a cylindrical collector or moving belt, to form a spunbond web. In the meltblown process, hot air is injected at the spinneret orifices, which serves to attenuate the molten fluid streams as they solidify and are deposited on a take up surface, thereby forming a microfiber web. In the jet process, the strands are collected in a jet, such as for example, an air gun, and blown onto a take-up surface such as a roller or a moving belt to form a spunbond web. In the meltblown process, air is ejected at the surface of the spinneret, which serves to simultaneously draw down and cool the thin fluid streams as they are deposited on a take-up surface in the path of cooling air, thereby forming a fiber web. Fibers may also be puddled into a suitable container for later processing.

Regardless of the type of melt spinning procedure which is used, the thin fluid streams can be melt drawn down in a molten state, i.e. before solidification occurs to orient the polymer molecules for good tenacity. Typical melt draw down ratios known in the art may be utilized. Where a continuous filament or staple process is employed, it may be desirable to draw the strands in the solid state with conventional drawing equipment, such as, for example, sequential godets operating at differential speeds.

Following drawing in the solid state, the continuous filaments may be crimped or texturized and cut into a desirable fiber length, thereby producing staple fiber. The length of the staple fibers for nonwoven and textile applications generally ranges from about 10 to about 75 millimeters, although the fibers can be longer or shorter as desired.

The fibers of the invention can be staple fibers, continuous filaments, or meltblown fibers. In general, staple, multifilament, and spunbond fibers formed in accordance with the present invention can have an equivalent diameter of about 0.5 to about 100 denier. Meltblown filaments can have a fineness of about 0.001 to about 2.0 denier. The fibers can also be monofilaments, which can have a fineness ranging from about 20 to about 5,000 denier.

FIGS. 3A and 3B illustrate cross-sectional views of various exemplary laminate structures in accordance with other embodiments of the present invention. The laminates of the invention can include at least two layers, such as laminate 30 of FIG. 3A, which includes layers 32 and 34. The present invention is not so limited, however, and the laminates can include three layers, such as layers 32', 33 and 34' of laminate 30' of FIG. 3B, or more layers. Each layer or ply of the laminate can be formed of the same or different materials, so long as at least two distinct layers or plies (also components) thereof include different ones of the reactive agents in accordance with the present invention. Various materials known in the art for the production of laminate structures can be useful in the present invention, including for example, films (including co-extruded films), nonwoven, woven, and knit fabrics, foams or cellular layers, cellulosic layers, metal and/or metallized layers, coatings, sheet materials, hot melt adhesives, laminates, composites, and the like, and combinations thereof, any layer of which can include at least one reactive agent incorporated therein.

The layers or plies of the laminate structures may be bonded and/or laminated in any of the ways known in the art. Lamination and/or bonding may be achieved, for example, by hydroentanglement of fibers, spot bonding, powder bonding, calendering, through air bonding, extrusion coating, direct extrusion (for example, direct extrusion of one or more film layers), and the like. It is also possible to achieve bonding through the use of an appropriate bonding agent, i.e., an adhesive. The term spot bonding is inclusive of continuous or discontinuous pattern bonding, uniform or random point bonding or a combination thereof, all as are well known in the art. The bonding may be made after assembly of the laminate so as to join all of the plies or it may be used to join only selected of the fabric plies prior to the final assembly of the laminate. Various plies can be bonded by different bonding agents in different bonding patterns. Overall, laminate bonding can also be used in conjunction with individual layer bonding.

The thickness of the component layers or plies of the laminates can vary so long as the flame retardant agents are sufficiently close to one another so that at least one of the flame retardant agents can migrate to and react with the other of the flame retardant agents when the article is subjected to initiation conditions. For example, laminate components including different ones of the flame retardant agents can be separated by several microns, for example, up to 10, 100, or more microns, so long as at least one of the flame retardant agents can migrate to the other prior to breakdown or loss of supporting polymer matrix when the article is subjected to flame conditions. The laminate components can have substantially the same thickness or can have varying thicknesses. Generally, the laminate components can have a thickness ranging from about 1 to about 100 mils.

The laminates of the invention can also include one or more coating layer(s), which may include at least one of the flame retardant agents in accordance with the present invention. The coating layer(s) can be formed of any of the types of polymers suitable for coating a substrate, including without limitation various polyolefins. The coating weight of the coating layer can vary, and typically ranges from about 0.5 to about 200 grams per square meter, for example, from about 1 to about 10 grams per square meter, although coating weights outside of these ranges can also be used. The thickness of the coating can also vary, typically ranging from about 0.5 mils to about 10 mils, although thicknesses outside this range can also be employed. It is noted that such coatings can fill web and/or fabric interstices, and accordingly the thickness of coatings can vary to account for such interstitial filling as well.

Any of the multipart flame retardant systems known in the art can be useful in the present invention, so long as the flame retardant system includes at least two reactive agents which are capable of reacting with one another to provide a flame retardant effect. As used herein, reference to the "reaction" of the reactive agents with one another to provide a flame retardant effect can include any of the mechanisms useful for imparting flame retardancy to an article. As a non-limiting example, the reactive agents can react with one another to produce a vapor or gaseous product that can have flame retardant properties. The gas or vapor can impart flame retardancy to the article via various mechanisms, such as expanding the volume of resin present in the article during combustion, smothering or retarding the release of combustible gases, creating a cooling effect, and other mechanisms as will be appreciated by the skilled artisan.

The present invention is not so limited, however, and reference to the "reaction" of the reactive agents as used herein can also include the use of at least one of the reactive agents as a catalyst to initiate a reaction of the other of the reactive agents to provide the desired flame retardant effect. As a non-limiting example, at least one of the reactive agents can act as a catalyst to initiate char formation of the other of the reactive agents. Accordingly, in those embodiments of the invention in which one of the reactive agents is a catalytic agent, the reactive agents react only in the sense that one agent serves as a catalyst. As yet another non-limiting example of such a "reaction," at least one of the reactive agents can initiate cross linking of the other of the reactive agents. This mechanism can be advantageous for tying up fuel in a resin.

Non-limiting examples of suitable flame retardant systems useful in the present invention can accordingly include without limitation gas generating flame retardant systems (including intumescent flame retardant systems which can also generate a char in addition to a gas), char forming flame retardant systems, and cross linking or other reactions capable of tying up fuel in a resin article, as well as halogenated hydrocarbon/metal synergist (such as bromine/antimony) flame retardant systems, and the like and mixtures thereof. Gas generating flame retardant systems can be particularly useful in various embodiments of the present invention.

As used herein, a gas generating flame retardant system can include a flame retardant system that undergoes swelling and/or foaming, and optionally charring, when exposed to suitable initiation conditions, typically a flame. Gas generating flame retardant systems useful in the present invention can include at least two, or more, reactive components as are well known in the art and which are commercially available. Gas generating flame retardant systems useful in the present invention can include at least one blowing agent and at least one triggering agent.

The blowing agent can include one or more compounds capable of producing gases or vapors, which can act to expand the volume of resin present in the article during combustion, i.e., can create a foam. The foaming action can further impact flame retardancy by smothering or retarding the release of combustible gases, creating a cooling effect, and other mechanisms as will be appreciated by the skilled artisan.

The triggering agent can include one or more compounds capable of initiating a flame retarding effect upon reaction with the other of the flame retardant agents. In some cases, the triggering agent can act as a catalyst to initiate or induce intumescence of the blowing agent.

Exemplary blowing agents useful in the present invention can include one or more compounds capable of releasing carbon dioxide, including without limitation carbonates selected from the group consisting of sodium bicarbonate, sodium carbonate, and calcium carbonate, and mixtures thereof. Other exemplary blowing agents useful in the present invention can include one or more compounds capable of releasing water. Such compounds can include, for example, compounds having alcohol functionality, including polymer resins having hydroxyl functionalities, such as phenoxy resins and poly(vinyl alcohol) (PVOH) resins, and the like, and mixtures thereof. As non-limiting examples, phenoxy resins suitable for use in the present invention include the InChemRez® resins available from InChem Corp., and PVOH resins suitable for use in the invention include the POVAL® resins available from Kuraray. The present invention is not limited to polymeric alcohols, and other alcohols can also be useful in the invention, including large organic alcohols such as stearol (which can be migratory) and the like. Other such compounds can include hydrates, such as metal hydrates, capable of releasing water upon activation under flame conditions. Such compounds are also well known in the flame retardant art and are commercially available. In certain embodiments of the invention, the article component including the blowing agent can also include a char forming agent, such as a phosphate compound as described herein, to provide additional flame retardant benefits.

The triggering agent can be an acidic material or one that can generate an acid component on pyrolysis. Exemplary triggering agents useful in the present invention can include without limitation one or more compounds selected from the group consisting of organic acids, organic alcohols, epoxides, amines, amides, and the like, and mixtures thereof. Generally these and other such compounds can have a molecular weight sufficiently high so that the compound can be processed but low enough so that it can be migratory under flame conditions. The compounds can have a number average molecular weight ranging from about 100 to about 1000, for example, a number average molecular weight from about 100 to about 200. Exemplary organic acids useful in the present invention include without limitation one or more compounds selected from the group consisting of citric acid, stearic acid, and the like, and mixtures thereof. As a non-limiting example, citric acid is widely available commercially from many sources including FMC Corp., Hercules, BP Chemical, and Celanese Americas Corp. A non-limiting example of an amide that can be useful in the invention is ethylene bis stear-amide.

Char forming flame retardant systems are also known in the art. Such systems useful in the invention can include a char initiation agent (or char catalyst) capable of initiating char formation of a char forming compound. Char forming compounds include without limitation various char forming polymers, including polyesters. The char initiation agent can include any of the types of char initiation agents known in the art, such as but not limited to phosphorous compounds, borates, titanates, and the like and mixtures thereof. Exemplary phosphorous compounds useful as char initiation agents can include one or more of phosphate esters, phosphinates, phosphonates, phosphinites, phosphonites, and the like, and mixtures thereof. Compounds that can generate a char initiation agent (such as a phosphate that releases a mobile form of phosphorous upon reaction with an acid) are also within the scope of this aspect of the invention. An exemplary compound that can generate a char initiating agent is sodium phosphate. Upon reaction with an acid such as citric acid, sodium phosphate can release phosphoric acid, which can be a char catalyst in polyester. Exemplary sodium phosphate compounds include without limitation $Na_3PO_4$, sodium dihydrogen phosphate ($H_2NaPO_4$), and disodium hydrogen phosphate ($Na_2HPO_4$). Of these, disodium hydrogen phosphate has the most neutral pH and so is most inert toward, for example, polyester and human skin contact. In an example of a multicomponent article in accordance with this aspect of the invention, at least one component thereof can include a char initiation agent, such as a phosphorous, borate and/or titanate compound (which can be migratory under flame conditions), and at least one other component thereof can include a char forming polymer, such as a polyester resin, optionally located within another polymer carrier, such as an olefin carrier.

Flame retardant systems that utilize a cross linking or other reaction capable of tying up fuel in a resin article can also be useful in the present invention. Such systems are also known in the art and are commercially available. An exemplary cross linking flame retardant system can include one or more cross linking agents, such as multifunctional acids, epoxies, phenoxy resin, and the like, and mixtures thereof, as one reactive agent. Such a system can further include a polymer resin capable of cross linking, such as a polyamide resin, as the other reactive agent of the flame retardant system. In an example of a multicomponent article in accordance with this embodiment of the invention, at least one component thereof can include a cross linking agent (which can be migratory under flame conditions) and at least one other component thereof can include a crosslinkable resin, such as a crosslinkable polyamide resin, optionally located within another polymer, such as a polyester carrier.

Exemplary flame retardant systems useful in the present invention include flame retardant agents that react with one another to form a byproduct having minimal or no adverse properties when contacted with humans. In this regard, an exemplary flame retardant system in accordance with the present invention can include citric acid as a triggering agent and sodium bicarbonate as a blowing agent. The reaction product is carbon dioxide. Another example of an exemplary flame retardant system useful in the present invention includes citric acid and sodium phosphate. The reaction product for this system is phosphoric acid, which can promote char formation in certain polymers, such as polyesters. Yet another example of an exemplary flame retardant system useful in the present invention includes citric acid as the triggering agent and either a phenoxy polymer or poly vinyl alcohol (PVOH), both advantageously with hydroxyl functionality on the backbone thereof. The reaction product of this system is water. Because these flame retardant systems can include components that are Generally Recognized As Safe (GRAS) by the FDA and/or other government agencies, these systems can be particularly advantageous, for example, for applications in which human contact may occur.

The flame retardant agents can be present in the multicomponent articles in an amount sufficient to impart the desire flame retardant effect when the article is subject to activation conditions. Flame retardant agents can be present in an amount ranging from about 0.1 to about 20 weight percent, for example, from about 0.1 to about 3 weight percent, based on the total weight of the article, although amounts outside of these ranges can also be useful in the present invention. Typically, up to about 3% particulates or up to about 20% of a melt blendable additive or polymer can be added to a matrix polymer and still be able to spin fibers, though larger concentrations can be used in bicomponent fibers.

The reactive agents can mixed with the polymer(s) forming the article using conventional mixing techniques. In one embodiment, the reactive agents can be separately dry blended with one or more polymer(s) prior to melting the polymer(s) in subsequent extrusion or other polymer processing steps. Alternatively, the reactive agents can be added to separate polymer melts, for example, to a polymer melt as it passes through an extruder. In other alternatives, a masterbatch of polymer and reactive agent can be prepared and added to polymer in dry or melt form. The reactive agent can be used in the invention in various forms, including powder, liquid and melt forms, as appropriate for a given flame retardant system.

At least two components of the articles of the invention can be formed of different polymer compositions, as contrasted to articles formed solely of a blend of two or more polymers or formed of a single polymer (a unicomponent article). Various ones of the components of the article, however, can comprise polymer blends, so long as the article includes distinct polymeric components or segments. In addition, in certain embodiments, such as various laminate structures, fiber bundles, and/or fabric structures, various ones of the components can be formed of the same polymer composition so long as the components are distinct from one another. As a non-limiting example, the article of the invention could include two preformed polyester films layers laminated to one another to form a laminate structure including two distinct layers formed of the same polymer composition. Alternatively, or in addition to, the article can include components comprising the same polymer composition with one or more intermediate components formed of a different polymer composition dispersed therebetween (for example, a laminate including outer layers formed of the same polymer composition and sandwiching therebetween an inner layer formed of a different polymer composition). As another non-limiting example, the article of the invention can include a yarn or fabric formed of a plurality of discrete fibers or filaments, which can include mixed deniers, mixed fiber lengths, segmented splittable fibers, and the like, and further each of which can be formed of the same or different polymer compositions.

The article can optionally include other additives or agents not adversely affecting the desired properties thereof. Examples include, without limitation, antioxidants, stabilizers, particulates, pigments, talc, and the like. These and other additives can be used in conventional amounts. As a non-limiting example, one or more components of the article can include one or more reinforcing agents and/or fillers, such as but not limited to glass fibers, clays, silicas, mineral silicates, mica, and the like and combinations thereof.

As yet another non-limiting example, in certain advantageous embodiments, the article can include in one or more components thereof additional flame retardant agent(s), such as char forming agents. The char forming agent, when present, can be the same as one or both of the triggering agent and/or the blowing agent. Alternatively, or in addition to, the article can include a char forming agent that is separate from the triggering agent and/or the blowing agent. Still further, the article can be formed of a material having char formation properties. Char forming agents are known in the art, are commercially available, and include, for example, phosphorous compounds, borates, and the like, and mixtures thereof.

The articles of the invention can also include one or more components (i.e., fibers) that are inherently flame retardant, including without limitation, article components (such as fibers) made of glass, polybenzimidazole, polyimides, polyarenes, metals, quartz, ceramics, polyetherketones, polyetheretherketones, polyetherketoneketones, polyetheretherketoneketones, polyetherimides, polysulfones, polyarylates, polyaryletherketones, polyamide-imides, polyarylsulfones, polyethersulfones, polyketones, polyphenylene sulfides, polyaramids such as Kevlar and Nomex, and carbon and carbonizable compounds.

The level or degree of flame retardancy exhibited by the articles of the invention can vary and can depend upon factors such as the particular flame retardant system employed, the amount of the flame retardant agents used, the types of other materials, including polymers, other flame retardant agents, etc., incorporated into the articles, the particular application for the article (fire barrier, mattress cover, etc.), industry and government requirements for a particular article, and the like. The desired level of flame retardancy to be exhibited for a particular article can be readily determined by the skilled artisan. For example, the article can exhibit relatively low levels of flame retardancy sufficient to pass flame retardancy tests such as a burn rate test used in the automotive industry. The articles can also exhibit sufficient flame retardancy to pass self extinguishing tests, such as but not limited to carpet pill tests, NFPA 701 textile test, and the like as are known in the art. Still further, the articles of the invention can exhibit sufficient flame retardancy to pass relatively stringent flame retardancy tests such as recent legislation passed in California for mattress covers. The flame retardant properties of the articles of the invention can be readily evaluated and determined using these and other industry standards as known in the art.

The articles of the invention may be useful in a variety of applications for which fire or flame retardance is desired, including without limitation components in building materials for offices, such as wall coverings, wall panels, office panel partitions, ceiling panels, floor coverings and the like. Other applications include bedding such as mattress and pillow covers, mattress ticking, bedspreads, and the like; draperies; protective apparel, such as fire suits for firefighters, military personnel, race car drivers, and the like; field fire shelters; tenting; awnings; tarps; carpeting; and the like. Other applications include apparel for helicopter or other flight crews; pajamas; apparel for assisted living facilities, hospitals, nursing homes and other medical facilities; and vehicle components (such as seating) for various forms of transportation (including private and public transportation means and common carriers), such as buses (including school buses), automobiles, trucks, and airplanes; and the like.

The present invention will be further illustrated by the following non-limiting examples.

EXAMPLE 1

An intumescent layer is created on a solid object such as glazing by coating the object with a layer of a phenoxy resin, such as a phenoxy resin commercially available from InChem Corp. under the trade name InChemRez®, followed by a layer of citric acid loaded olefin (such as a maleated polypropylene wax, commercially available from Eastman Chemical under the trade name Epolene®). The citric acid is commercially available, for example, from various sources such as FMC Corp., Hercules, BP Chemical, and Celanese Americas Corp. The citric acid loaded polyolefin layer can also include additional additives, such as glass or mica flakes, to impart integrity to the char layer. All reactive agents are substantially uniformly incorporated into the fiber for maximum efficacy at controlled costs.

EXAMPLE 2

An extension of example 1 above is as follows. The inventors have found that phosphorous-based flame retardants such as resorcinol bis-diphenyl phosphate (RDP) can be more effective when used with a polyester, such as polyethylene terephthalate (PET), having substantially no cyclohexanedimethanol ("CHDM") units, or isophthalic units, and that the effectiveness of such phosphorous based flame retardants work decreases with increasing CHDM content. Conversely, CHDM copolyesters can crystallize less readily and can be more suitable for glazing. RDP can increase crystallization rates so one can alter the desired balance of CHDM vis-à-vis crystallinity on one hand and burning on the other.

Thus the invention can include a multi-layer coextrusion with PET (or APET, a high molecular weight PET, which can be purchased as pellets from Eastman Chemical Company under the name VORIDIAN PET 9921 or in sheet form as PACUR™ 9921) on the outside and a heavily loaded RDP (up to 20 weight percent) in PETG (a high CHDM PET, i.e., up to 31 percent CHDM content, such as PETG under the Eastman or Spectar trade name commercially available from Eastman Chemical) core. The central core, being substantially amorphous, could tolerate the high RDP level and remain ductile. The outer layers would retain the crystallinity and toughness of PET/APET. Under flame conditions, the RDP could migrate readily and protect the PET, whereas an RDP/PET system by itself would not be suitable because of too much crystallinity. As an added advantage, the higher shrinkage of the soft central portion would put the skin of the construct under compression, thus increasing its strength.

A non-limiting example of the foregoing can include a seven (7) layer glazing product as follows: d) an outer layer including a composition of maleated polypropylene wax/mica flake/citric acid; c) a tie layer including a phenoxy resin; b) a strength layer including APET; and a) a core layer including PETG with 20% RDP. The product could be a fairly transparent, shatter resistant, abrasion resistant with easy repair glazing and act as a non-halogen, low-smoke fire barrier.

EXAMPLE 3

As another non-limiting example, polypropylene staple fiber and/or filaments can be produced that include up to 10% of a phenoxy resin. Other polypropylene staple fibers and/or filaments can also be produced that include up to 10% citric acid. The polypropylene staple fibers and/or filaments can be combined using any of the techniques known in the art to form a multicomponent fiber bundle or yarn exhibiting flame retardant properties. As an example, staple fibers can be twisted together to form a spun yarn. Alternatively, filaments can be laid together without twist to form a zero-twist yarn or with some degree of twist.

EXAMPLE 4

A tufted carpet can be made from a twisted pair of PTT yarns, one of which contains about 1% citric acid and another of which contains about 1% calcium carbonate. The resultant product can exhibit improved performance in the radiant panel flame retardant test for residential carpet. In tufted carpets, it can be important that the twisted ends have and maintain a durable, tight twist definition, both for carpet quality and to maintain close contact between the yarns containing the reactive agents.

EXAMPLE 5

A tufted carpet can be made from a twisted pair of PTT yarns. One of the yarns contains about 3% citric acid and about 5% RDP, and one other yarn contains a mixture of about 1.5% each of micro-pulverized calcium carbonate and calcium phosphate. This can give improved performance in the radiant panel flame retardant test for contract commercial carpet.

EXAMPLE 6

A needlepunched nonwoven fabric can be made of a substantially uniform blend of a PET fiber with about 5% RDP, a fiber formed of a blend of PET with about 10% phenoxy resin, and a PET fiber with about 3% percent citric acid and about 5% RDP. The product can foam significantly in flame conditions and can provide improved fire barrier performance. All reactive agents are substantially uniformly incorporated into the fibers for best results.

EXAMPLE 7

One polyester bulk continuous filament (BCF) yarn is spun with a few percent citric acid in it. Sodium bicarbonate is incorporated in a second polyester BCF yarn. The two fibers are twisted together and used to tuft a carpet. When exposed to a flame, the citric acid migrates, reacts with the sodium bicarbonate to produce carbon dioxide. The resulting foaming of the substrate would reduce its propensity to burn and slow its burn rate. This should reduce the effect of radiant panel heat in a carpet burn test, for example, and upgrade the flame rating a carpet may receive.

EXAMPLE 8

Citric acid is spun into one fiber and disodium hydrogen phosphate is incorporated into another. These fibers can be crimped and cut as staple fiber, then blended into a needlepunched nonwoven. When exposed to flame, the reaction product is phosphoric acid, which is a strong char promoting agent for polyester. $H_3PO_4$ is not normally put directly into polyester due to its corrosive effect on machinery, but here it could be a potent flame retarding agent, generated only after the flame hits it. This could be used in conjunction with the chemistry of Example 7 to give both elements of an intumescent flame retardant system, from common household food-grade additives that are less expensive than the polymers they are protecting. These materials could have strong self-extinguishing characteristics.

EXAMPLE 9

Using citric acid or some other mobile organic acid in one fiber, the second fiber can have a high loading of functional-OH groups pendant from the polymer chain. Examples of such polymers are poly vinyl alcohol (PVOH) and phenoxy resin (which is used in food contact applications). These functional polymers may be unicomponent, or may be blended with other polymers for better physical properties. In addition, a phosphate ester plasticizer like resorcinol bis (diphenyl phosphate) (RDP) can be incorporated at high levels in either fiber without reacting with these functionalities. When exposed to flame, the acids can migrate and react with the hydroxyl groups to off-gas water, foaming the substrate. The higher functional loadings achievable with these fiber-friendly additives may provide fire-barrier levels of performance sufficient for use in mattress covers.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

That which is claimed is:

1. A multicomponent article having fire retardant properties, comprising:
   at least a first article component and at least a second article component; and
   a flame retardant system comprising at least a first reactive agent and a second reactive agent that react with one another to provide a flame retardant effect, wherein said first reactive agent is present in at least one of said first and second article components and said second reactive agent is present in the other of said first and second article components which is different from the article component in which the first reactive agent is present, and wherein said first reactive agent migrates under flame conditions to the other of said first and second article components and reacts with said second reactive agent present therein to provide a flame retardant effect.

2. The article of claim 1, wherein the flame retardant system generates a gas.

3. The article of claim 2, wherein at least one of the reactive agents comprises at least one triggering agent capable of initiating a flame retarding effect upon reaction with the other of the reactive agents.

4. The article of claim 3, wherein at least another of the reactive agents comprises at least one blowing agent capable of creating a flame retardant effect upon reaction with the triggering agent.

5. The article of claim 3, wherein said at least one triggering agent comprises at least one compound selected from the group consisting of organic acids, organic alcohols, epoxides, amines, amides, and mixtures thereof.

6. The article of claim 5, wherein said organic acids comprise at least one compound selected from the group consisting of citric acid, stearic acid, and mixtures thereof.

7. The article of claim 4, wherein said at least one blowing agent comprises at least one compound selected from the group consisting of compounds capable of releasing carbon dioxide, compounds capable of releasing water, and mixtures thereof.

8. The article of claim 7, wherein the compounds capable of releasing carbon dioxide comprise at least one carbonate compound.

9. The article of claim 8, wherein said at least one carbonate compound is selected from the group consisting of sodium bicarbonate, sodium carbonate, calcium carbonate, and mixtures thereof.

10. The article of claim 7, wherein the compounds capable of releasing water comprise at least one compound having hydroxyl functionality.

11. The article of claim 10, wherein said at least one compound having hydroxyl functionality comprises at least one polymer having hydroxyl functionality.

12. The article of claim 11, wherein said at least one polymer having hydroxyl functionality is selected from the group consisting of phenoxy resins, polyvinyl alcohol resins, and mixtures thereof.

13. The article of claim 10, wherein said at least one compound having hydroxyl functionality comprises at least one organic alcohol.

14. The article of claim 7, wherein the compounds capable of releasing water comprise at least one hydrate.

15. The article of claim 1, wherein said reactive agents of the flame retardant system comprise at least one Generally Recognized As Safe (GRAS) agent.

16. The article of claim 2, wherein the gas generating flame retardant system comprises citric acid and sodium bicarbonate.

17. The article of claim 3, wherein said activation conditions comprise a temperature sufficient to activate the triggering agent.

18. The article of claim 17, wherein said activation temperature comprises a temperature of at least about 230° C.

19. The article of claim 1, wherein the flame retardant system comprises a char forming flame retardant system.

20. The article of claim 19, wherein at least one reactive agent of the char forming flame retardant system comprises at least one char initiation agent or at least one compound capable of generating a char initiation agent.

21. The article of claim 20, wherein the char initiation agent comprises at least one compound selected from the group consisting of phosphorous compounds, borates, titanates, and mixtures thereof.

22. The article of claim 20, wherein said at least one compound capable of generating a char initiation agent comprises at least one phosphate that releases a mobile form of phosphorous upon reaction with an acid.

23. The article of claim 22, wherein said at least one phosphate that releases a mobile form of phosphorous comprises sodium phosphate and wherein said acid comprises citric acid.

24. The article of claim 20, wherein said char forming flame retardant system further comprises a char forming polymer.

25. The article of claim 24, wherein the char forming polymer comprises a polyester polymer.

26. The article of claim 25, wherein at least one component thereof comprises a char initiation agent and wherein at least one other component thereof comprises a polyester resin and optionally an olefin resin.

27. The article of claim 1, wherein the flame retardant system comprises a cross linking flame retardant system.

28. The article of claim 27, wherein at least one reactive agent of the cross linking flame retardant system comprises at least one cross linking agent and wherein at least one other reactive agent of the cross linking flame retardant system comprises at least one crosslinkable polymer.

29. The article of claim 28, wherein at least one component thereof comprises a cross linking agent and wherein at least one other component thereof comprises a crosslinkable polyamide resin and optionally a polyester resin.

30. The article of claim 1, wherein at least one of the reactive agents comprises a halogenated compound and wherein at least one other of the reactive agents comprises an antimony synergist.

31. The article of claim 1, wherein said reactive agents are present in said article in an amount sufficient to provide a flame retardant effect under activation conditions.

32. The article of claim 31, wherein said reactive agents are present in said article in an amount from about 0.1 to about 20 weight percent, based on the total weight of the article.

33. The article of claim 1, wherein said article further comprises a char initiation agent.

34. The article of claim 33, wherein at least one of said reactive agents comprises said char initiation agent.

35. The article of claim 33, wherein said reactive agents together comprise said char initiation agent.

36. The article of claim 33, wherein said char initiation agent is a different compound than either of said reactive agents.

37. The article of claim 1, wherein said first and second article components comprising said reactive agents are adjacent one another.

38. The article of claim 1, wherein said article further comprises at least a third article component.

39. The article of claim 38, wherein said first and second article components comprising said reactive agents are adjacent or in contact with one another.

40. The article of claim 38, wherein said at least a third article component is disposed between said first and second article components comprising said reactive agents.

41. The article of claim 1, wherein at least one of said first and second article components comprises a polymer.

42. The article of claim 41, wherein both of said first and second article components comprise a polymer.

43. The article of claim 41, wherein said polymer is a flame retardant polymer.

44. The article of claim 43, wherein said flame retardant polymer comprises a char forming polymer.

45. The article of claim 42, wherein both of said first and second article components comprise the same polymer.

46. The article of claim 42, wherein each of said first and second article components comprises different polymers.

47. The article of claim 41, wherein said polymer comprises at least one polymer selected from the group consisting of polyesters, polyolefins, polyacrylates, polyamides, elastomers, polyacrylonitrile, acetals, fluoropolymers, epoxies, phenoxies, vinyl alcohol polymers, polyesterimides, Hytrel, hot melt adhesives, co- and ter-polymers thereof, ionomers thereof, and mixtures thereof.

48. The article of claim 1, wherein said article is a fiber bundle.

49. The article of claim 48, wherein said fiber bundle comprises at least two fibers or filaments, wherein at least one of said reactive agents is present in at least one of said fibers or filaments and the other of said reactive agents is present in the other of said fibers or filaments.

50. The article of claim 48, wherein said fiber bundle comprises at least one or more multicomponent fibers comprising at least two or more distinct polymeric segments, wherein at least one of said reactive agents is present in at least one of said components and the other of said reactive is present in another of said components.

51. The article of claim 1, wherein said article is a yarn.

52. The article of claim 51, wherein said yarn comprises at least two fibers or filaments, wherein at least one of said reactive agents is present in at least one of said fibers or filaments and the other of said reactive agents is present in the other of said fibers or filaments.

53. The article of claim 51, wherein said yarn comprises at least one or more multicomponent fibers comprising at least two or more distinct polymeric segments, wherein at least one of said reactive agents is present in at least one of said components and the other of said reactive is present in another of said components.

54. The article of claim 51, wherein said yarn comprises a plurality of staple fibers spun into said yarn.

55. The article of claim 1, wherein said article comprises a twisted pair of yarns.

56. The article of claim 1, wherein said article is a fiber comprising at least two distinct segments, wherein at least one of said reactive agents is present in at least one of said fiber segments and the other of said reactive agents is present in a different one of said fiber segments.

57. The article of claim 56, wherein said fiber is a bicomponent fiber.

58. The article of claim 56, wherein said fiber is a multi-component fiber comprises at least three or more distinct polymeric segments.

59. The article of claim 56, wherein said fiber comprises a fiber selected from the group consisting of sheath core fibers, pie wedge fibers, shaped fibers, islands in the sea fibers, and side-by-side fibers.

60. The article of claim 56, wherein said fiber comprises a fiber selected from the group consisting of continuous filaments, staple fibers, and meltblown fibers.

61. The article of claim 1, wherein said article is a laminate or composite comprising at least two layers, wherein at least one of said reactive agents is present in at least one of said laminate layers and the other of said reactive agents is present in the other of said laminate layers.

62. The article of claim 61, wherein said laminate comprises at least one film layer.

63. The article of claim 62, wherein said laminate comprises at least two film layers.

64. The article of claim 63, wherein said at least two film layers comprise coextruded film layers.

65. The article of claim 61, wherein at least one of said laminate layers comprises a coating.

66. The article of claim 1, wherein at least one of said article components comprises a coating.

67. The article of claim 66, wherein said article comprises a coated yarn.

68. The article of claim 66, wherein said coating optionally includes at least one reactive agent incorporated therein.

69. The article of claim 1, wherein at least one of said article components comprises a hot melt adhesive.

70. The article of claim 69, wherein said hot melt adhesive optionally includes at least one reactive agent incorporated therein.

* * * * *